Dec. 13, 1960
N. P. BORETTI
2,964,611
PRESSURE WELDING APPARATUS
Filed May 21, 1958
9 Sheets-Sheet 2
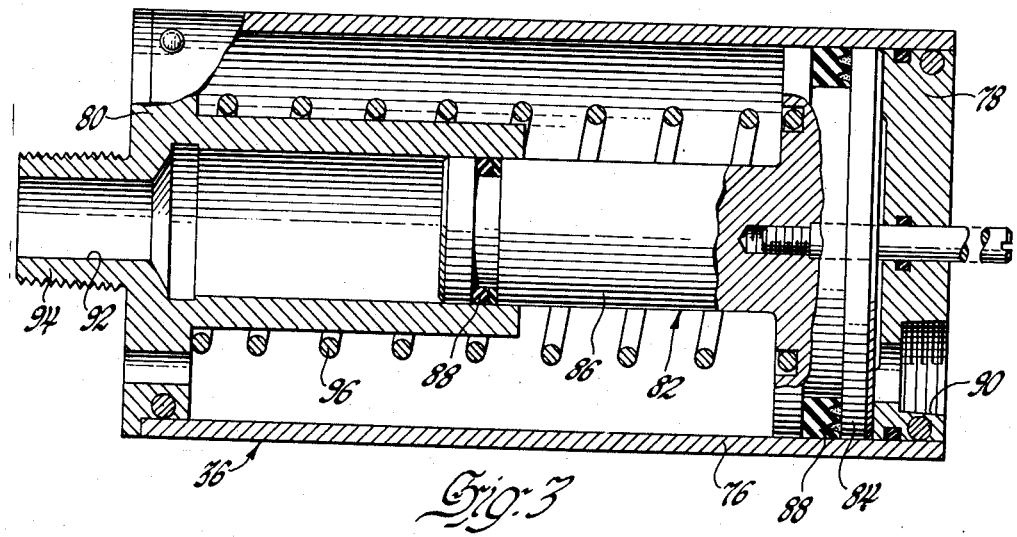
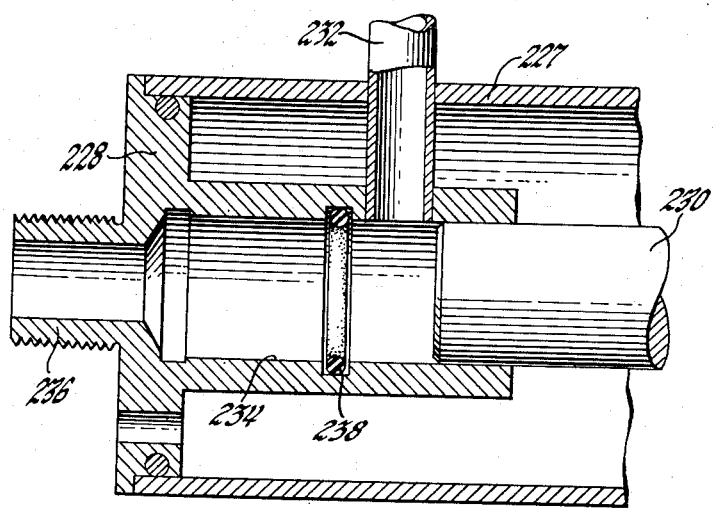
INVENTOR.
Napoleon P. Boretti
BY
L. D. Burch
ATTORNEY Dec. 13, 1960   N. P. BORETTI   2,964,611
PRESSURE WELDING APPARATUS
Filed May 21, 1958
9 Sheets-Sheet 3

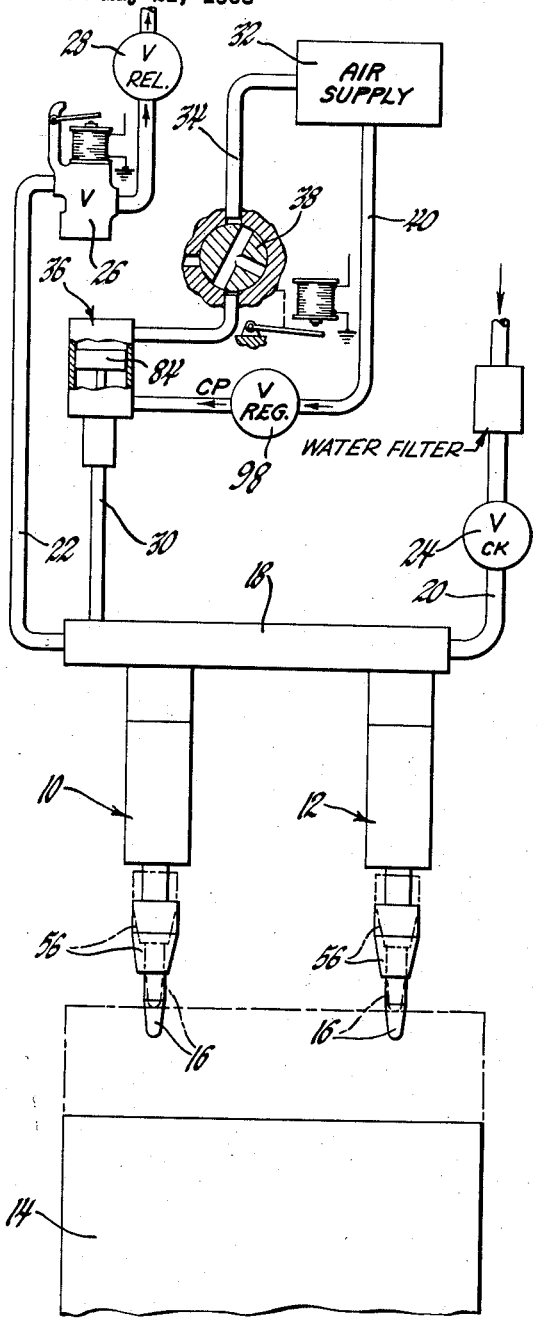
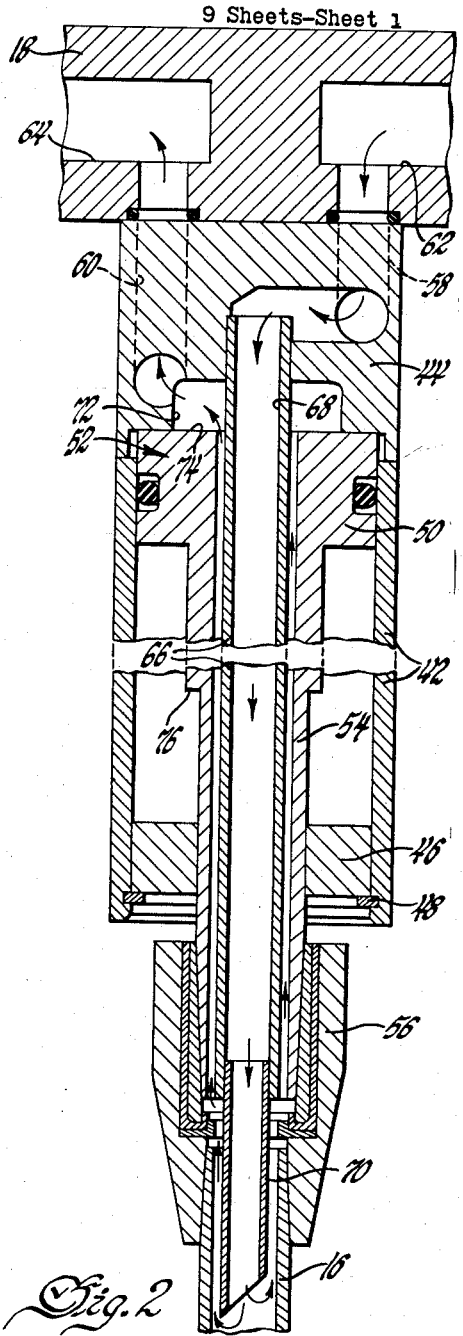

INVENTOR.
Napoleon P. Boretti
BY
R. A. Burch
ATTORNEY

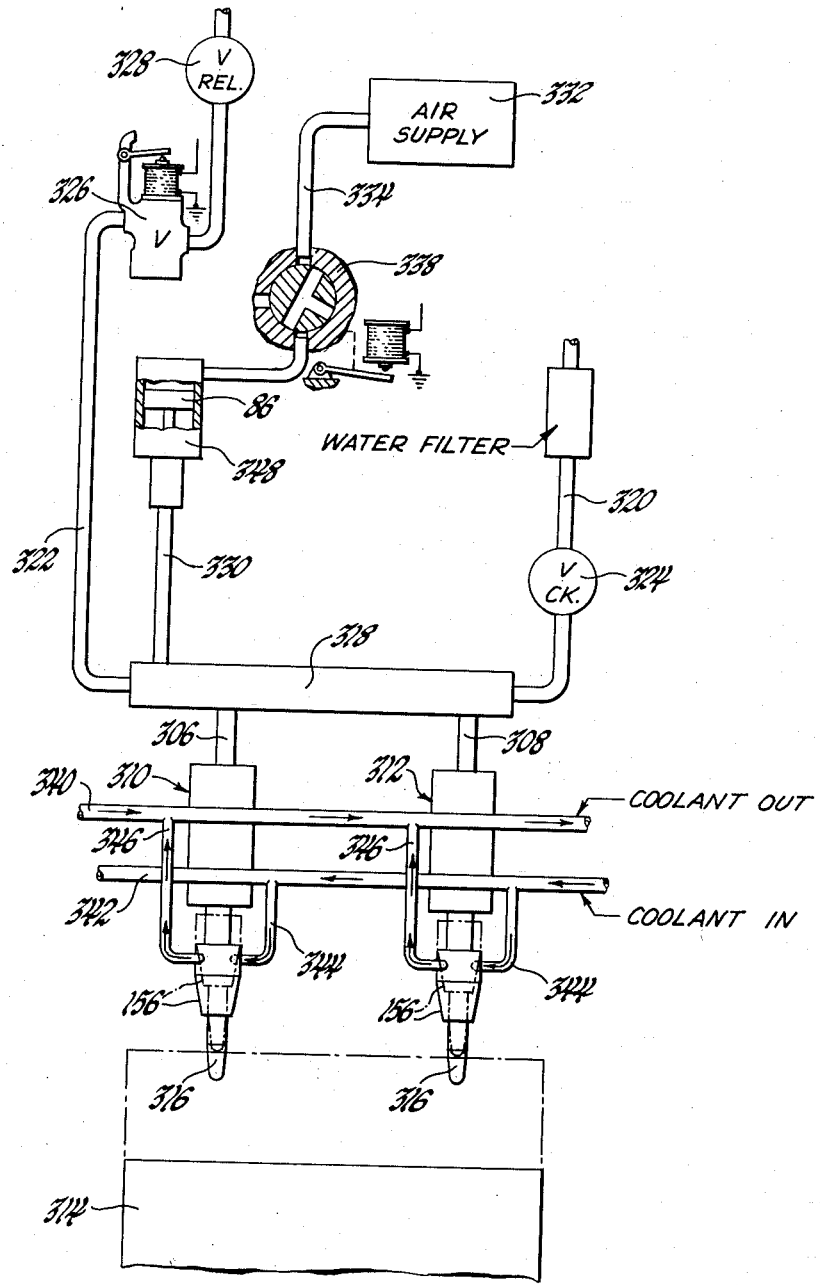

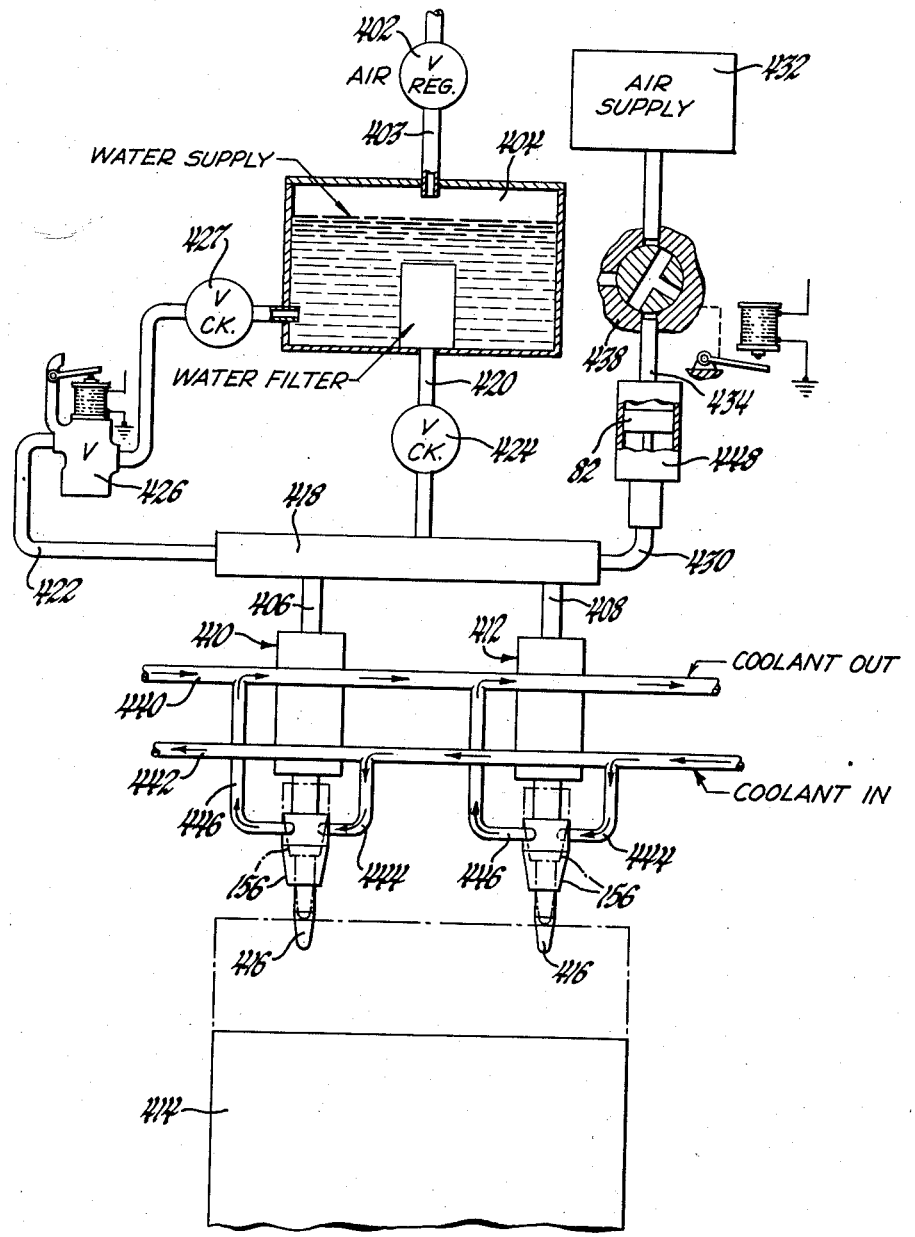

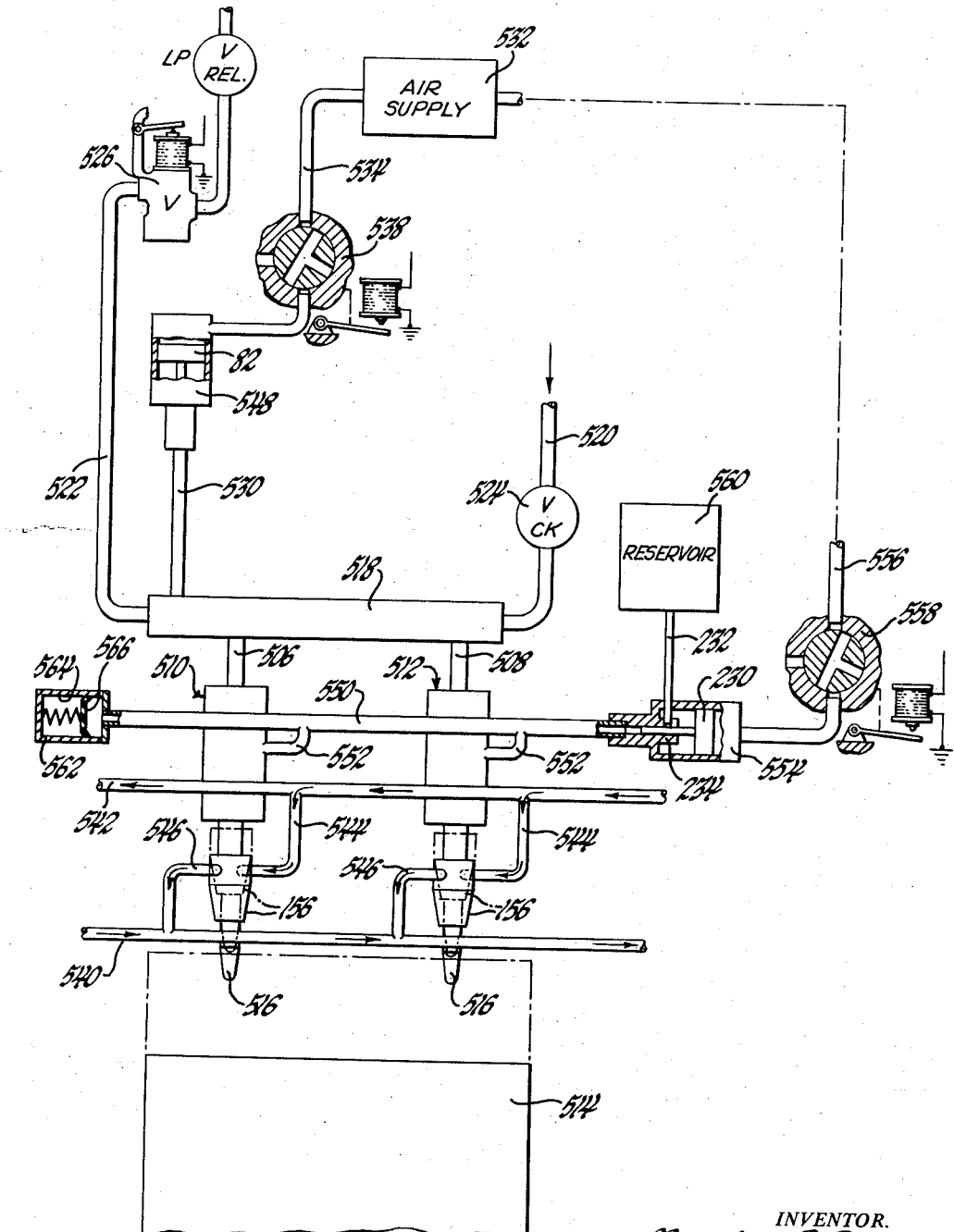

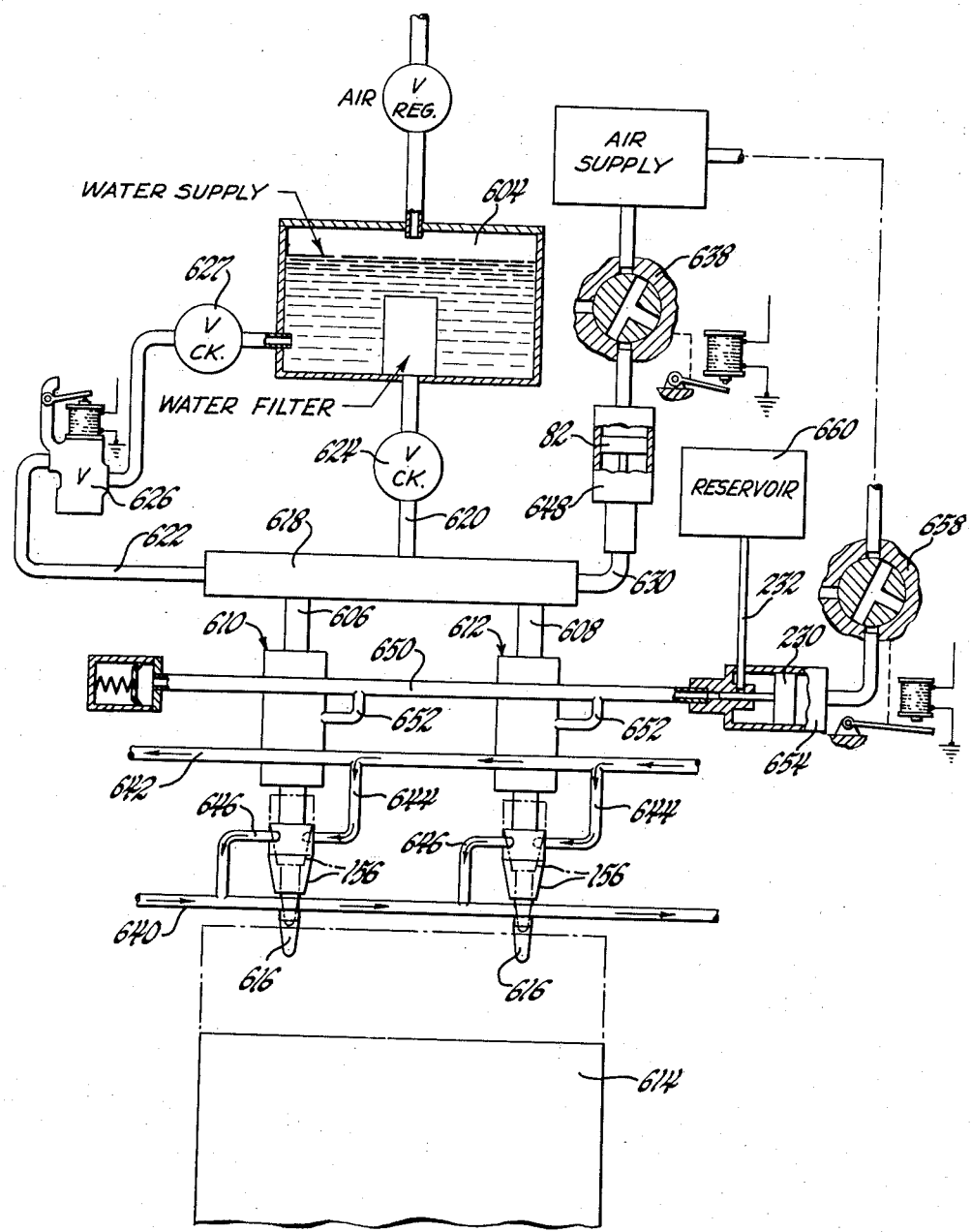

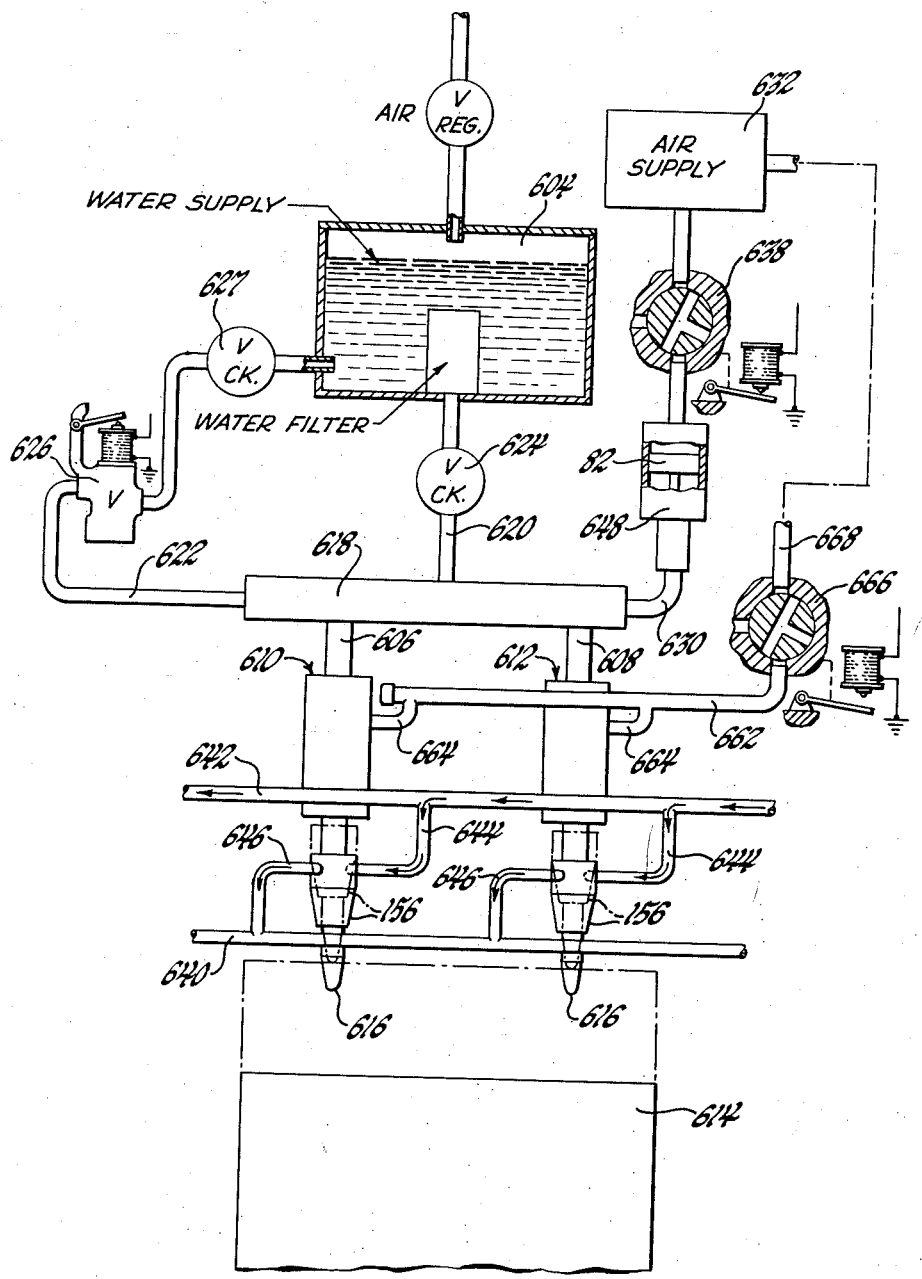

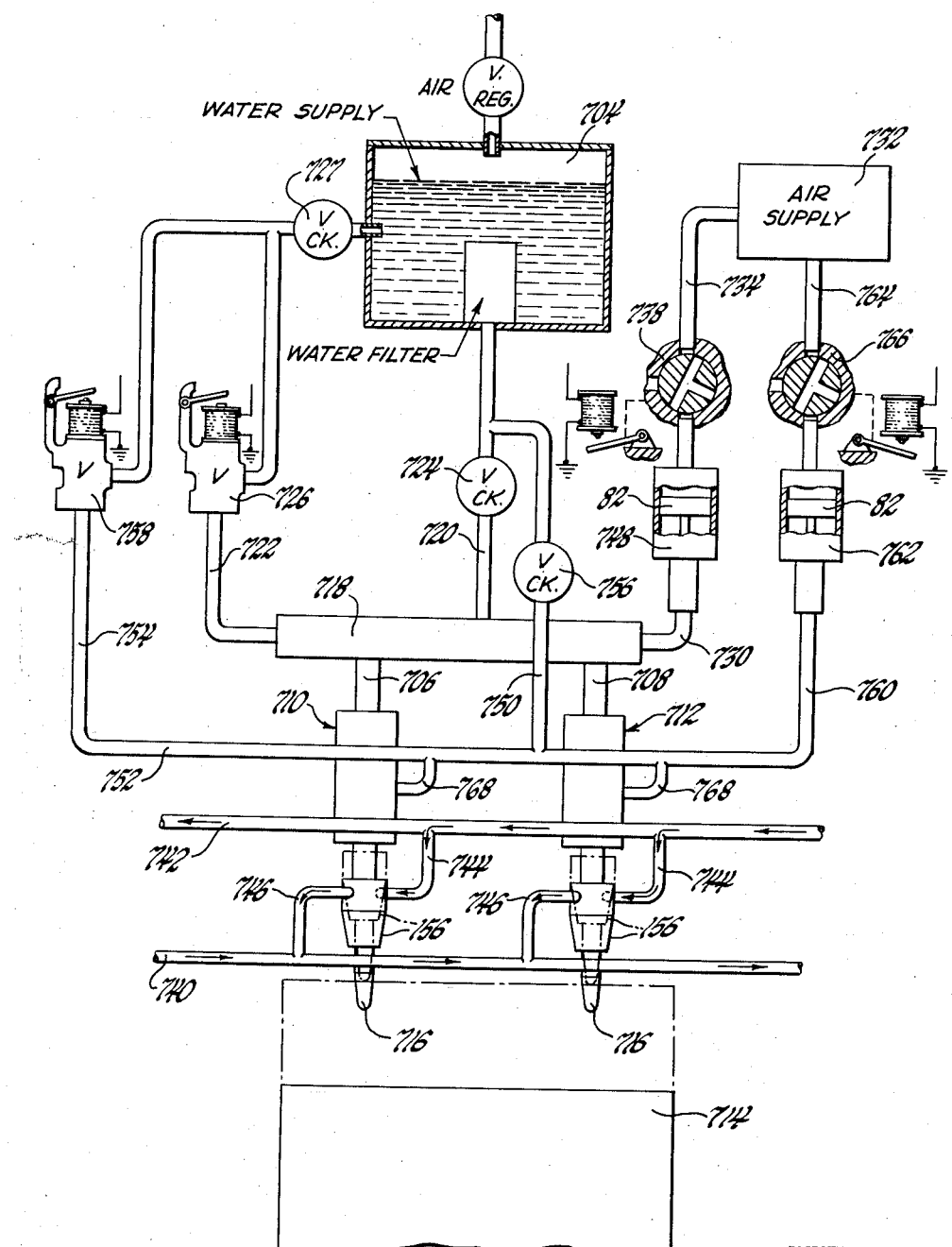

United States Patent Office 2,964,611
Patented Dec. 13, 1960

2,964,611

PRESSURE WELDING APPARATUS

Napoleon P. Boretti, Detroit, Mich., assignor to General Motors Corporation, Detroit, Mich., a corporation of Delaware Filed May 21, 1958, Ser. No. 736,831

29 Claims. (Cl. 219—87)

This invention relates to pressure welding systems and devices generally, and more particularly to the fluid pressurizing and coolant systems for pressure welding apparatus.

Press welding equipment in the past has generally included a plurality of welding guns having associated coolant and fluid systems to actuate the welding guns and advance the electrodes to follow the collapse of the weld and forge the welded parts together. This equipment has generally required hydraulic fluid that is expensive to use and quite often is a flammable material. Large hydraulic pumps have been necessary to pressurize the welding electrodes, and, incidental to large and expensive pumps, has been the necessity for large and expensive valves and fittings. Press welding systems now in use are ungainly and space consuming installations and require a large amount of movement in moving the guns to a welding position. Also incidental to large installations is the great amount of space taken up by the welding equipment, the high repair costs, and the difficulty in maintaining precise adjustments, such as welding pressures, and the like.

The device in which this invention is embodied comprises a welding press suitable to a great number of adaptations, provided with a movable platen for raising and lowering the workpiece to and from the welding guns and the applicability of a low pressure fluid supply, such as a plant water supply, to provide the necessary hydraulic fluid. The press is not limited to water, the welding system being adaptable to any fluid which is inexpensive and eliminates the danger of flammability. The device further requires only low pressure operations to pressurize the welding press.

An air-over-hydraulic type intensifier, or booster, system is incorporated with the water pressure system to provide the additional pressure required to advance the electrodes of the guns during the period of weld collapse. Because air pressure is used only to pressurize the water system, a very small change in the volumetric capacity of the system is realized at the time of weld collapse. The air consumption in the intensifier unit is very small, as well.

The device is applicable to open or closed fluid systems, such as the plant water system or a reservoir system, doing away with the large installation and repair costs otherwise required, and utilizes relatively small valves and parts.

Thus, an inexpensive press welding installation may be set up with great savings in parts and repairs and in operator effort to perform the welding operation.

These and other advantages will be more apparent in the description and discussion of the press welding device embodying the features of this invention.

In the drawings:

Figure 1 is a schematic illustration of a press welding device and its fluid system.

Figure 2 is a cross sectional view of a type of welding gun that may be used in the system of Figure 1.

Figure 3 is a cross sectional view of the air intensifier, or booster, used in the system of Figure 1.

Figure 4 is a view of a modified booster unit, with parts broken away and in section, to show the operation thereof.

Figures 7 through 12 are schematic illustrations of modifications of the press welding system embodying this invention.

Figure 5:
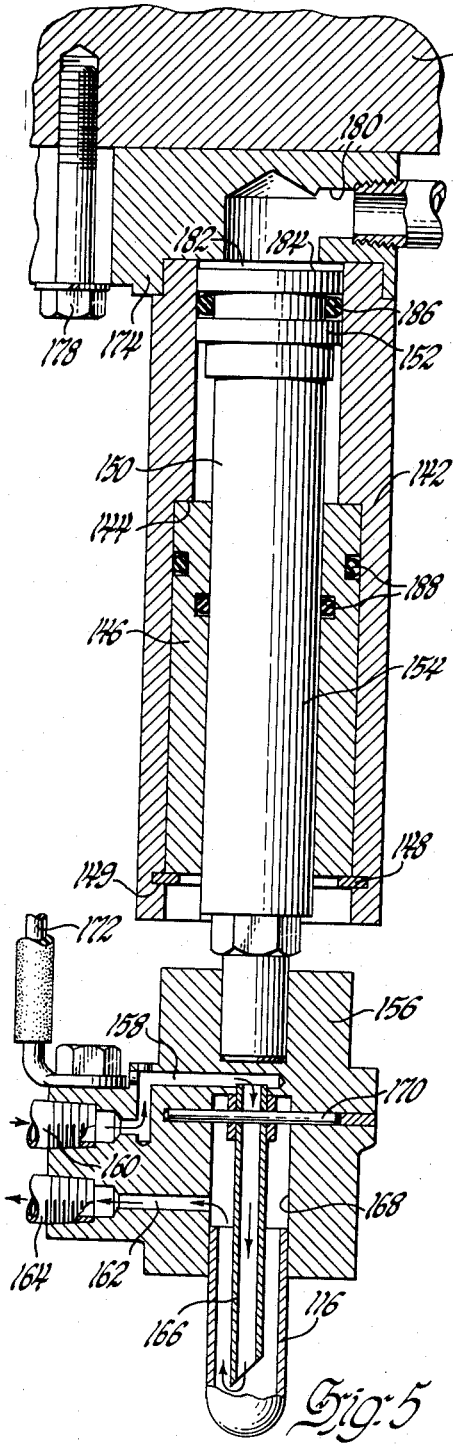
Figure 5 is a cross section view of a second type of welding gun which may be used in the welding system.

Referring more particularly to the drawings, a schematic illustration of the press welding system is shown in Figure 1. The device includes a plurality of welding guns illustrated generally by the numerals 10 and 12 which are mounted in a substantially vertical position in the upper part of a press device (not shown) and over a movable press bed or platen 14. The platen is adapted to receive and raise a workpiece, on which a welding operation is to be performed, into engagement with the depending electrode tips 16 of the welding guns.

A fluid pressure system, operatively connected to the welding guns 10 and 12, consists of a water manifold 18 placed in the plant water supply system. Inlet and outlet conduits 20 and 22 respectively, are provided in the manifold to convey the fluid to and from the manifold. A check valve 24 is located in the inlet conduit 20 to allow the flow of fluid only into the manifold and acts to prevent a back-flow of fluid through the inlet conduit. A solenoid operated check valve 26 is located downstream of the water manifold 18 in the outlet conduit 22 and may be actuated to stop the flow of fluid through the system. Farther downstream from the outlet check valve 26 may be located a low pressure relief valve 28 to further save on cost and prevent unnecessary flow of the water through the fluid system. The low pressure relief valve 28 would close the system to the flow of fluid under the normal plant water system pressure and be set to open at a pressure slightly above that of the plant water system. Unnecessary flow, therefore, is prevented through the system when the press device is not being used.

The air-over-fluid intensifier, or booster, system is operatively connected to the fluid pressure system as through the conduit 30, connected to the manifold 18. A suitable air supply 32 is located adjacent the installation and has a conduit 34 leading to the booster unit 36. The booster unit 36 will be later described in detail. A normally closed, solenoid operated, three way air valve 38 is placed at the line between the air supply 32 and the booster unit 36, and operates to supply air to the booster unit, to exhaust air from the booster unit, or to exhaust air from the air supply. A second conduit 40 leads from the air supply 32 to the booster unit 36 to provide an air return for the unit, which structure and operation will also be later described.

Figure 2 shows a welding gun which may be used in the welding press of Figure 1, consisting of a cylinder 42 secured to an upper block 44, the block being secured to the manifold 18. The lower end of the cylinder is closed by the closure member 46 and the snap ring 48. A piston member 50, shown in its retracted position, is disposed within the cylinder 42 and has a head portion 52 acting against the cylinder walls, and a shank portion 54 extending through the closure member 46. An electrode connecting block 56 is mounted on the end of the piston shank 54, extending beneath the cylinder member 42, and is insulated from the shank 54 in a conventionally known manner. The hollow electrode welding tip 16 is received within a tapered access formed in the end of the connecting block 56.

Passageways 58 and 60 are formed through one side of the upper block 44 and are in communication with the manifold flow passages 62 and 64 to provide an inlet and an outlet to the welding gun for fluid flowing in the manifold. A tubular conduit 66 having a passageway 68 therethrough, extends axially through the cylinder 42 and the shank 54 of the piston member and into the electrode connecting block 56. A smaller tubular conduit 70 is telescoped within the end of the conduit 66 to extend the passageway into the hollow tip 16 of the electrode.

The flow of fluid in the manifold 18 passes through the inlet passage 58, through the tubular conduit 66 and into the electrode tip 16. From the electrode tip, the fluid is forced upward along the outside of the tubular conduit 66 and inside of the shank 54 of the piston member and into the chamber 72, from which it is allowed to return to the manifold passage 64 through the passage 60. It may be seen, therefore, that fluid under pressure passing through the inlet 58, through the tubular conduit 66 and back to the chamber 72, will act on the upper face 74 of the piston member 50, and advance the piston member until the shoulder 76 abuts the closure member 46. The relation of parts is such that the normal plant water pressure is sufficient to advance the piston member to its lower position.

Referring to Figure 3, the air-over-fluid booster unit 36 is shown comprising a tubular housing 76, a closure member 78 secured at the upper end thereof, and a cylinder member 80 closing the lower end thereof. A piston 82, having a head portion 84 and a shank portion 86, acts within the tubular housing member 76 and the shank portion 86 extends into the cylinder member 80. Suitable seals, such as O rings 88 are provided to prevent the passage of air or fluid past the piston member. A passage 90 is provided in the upper closure member 78 to admit air under pressure from an air supply to act on the head portion 84 of the piston member and force the shank portion 86 into the cylinder member 80. A passage 92 in the cylinder member 80, and a pipe fitting 94 provide for connection of a fluid conduit and an entrance and exit for fluid into the cylinder member. Thus, it may be seen that air under pressure entering the housing 76 through the passageway 90 and acting on the head portion 84 of the piston member 82 will force a predetermined amount of fluid from the cylinder member 80 into the fluid pressure system through the passage 92. A spring 96 is provided to return the piston member 82 to its outward position on the release of air pressure on the head portion 84. However, the same result may be accomplished by supplying air to the housing member to act on the lower surface of the head portion. This is illustrated in Figure 1, the conduit 40 leading from the air supply 32, through a pressure regulator 98 to the bottom side of the piston head member 84.

The operation of the system shown in Figure 1 is as follows: Except during the welding cycle and in the absence of the low pressure relief valve 28, water flows through the inlet conduit 20 and check valve 24, to the manifold 18, through the inlet passage 58 in the welding gun, through the welding gun to the electrode tip 16, through the outlet 60 of the welding gun, to the manifold passage 64 and thus to the inlet of the second welding gun mounted on the device. The flow through the second welding gun, and any further welding guns, is the same as above described. The water thus operates to cool the electrode tip 16 and to move or retain the piston member 50 in its advanced position. At the beginning of the welding cycle, the movable platen 14 is raised, with the workpiece thereon, and as the platen presses against and raises the electrode tips 16, the piston members 50 in the welding guns are forced upwardly against the pressure of the fluid in the chambers 72, the inlet check valve 24 preventing back-flow of fluid to the plant water system. When the platen 14 reaches the welding position and the pistons 50 are located in their upper positions in the cylinders 42, the solenoid operated check valve 26 is closed to prevent further flow of water through the system and the welding guns begin the welding operation.

The check valves thus insure that the displaced water from the chambers 72 flows through the series of welding guns in a single direction. Since the guns are connected in series and the water can flow in only one direction, the displaced water from the chambers 72 in the first gun passes through the outlet 60 in the gun to the manifold passage 64 and then passes to the inlet of the next welding gun. The second welding gun must then pass the displaced water from the first gun and the displaced water from its own chamber. The flow of water, therefore, increases as each welding gun passes on its displaced water plus that from all the preceding guns. With this progressive increase of water flow, the more remote a welding gun is from the inlet the more water flows through and cools the electrode tip of that welding gun. Thus, the maximum cooling effect appears at the last welding gun of a group of guns connected in series.

At the proper time during the welding cycle the solenoid operated air valve 38 is actuated to allow the passage of air from the air supply 32 to the housing 76 of the booster unit 36 to force the shank portion 86 of the piston member 82 into the cylinder member 80, as seen in Figure 3. A small amount of fluid is displaced from the cylinder member 80 into the conduit 30 and is thus forced into the fluid pressure system. This displaced fluid acts through the manifold 18 and the inlet and outlet passages 58 and 60 in the welding guns to further pressurize the piston members 50 and advance the piston members slightly during the period of weld collapse, to obtain the proper follow-through.

After the welding cycle is completed, the booster unit 36 is de-energized by venting the air valve 38 to the atmosphere and allowing the air acting on the head portion 84 of the piston member 82 to exhaust. The solenoid operated check valve 26 is opened to restore water circulation in the fluid pressure system. The platen 14 returns to the loading position for removal and replacement of a workpiece.

Figure 5 shows a second type of welding gun that may be adapted to a press welding device of this kind. The welding gun consists of tubular cylinder member 142 having a closure block 146 retained in the tubular member by a shoulder 144, the one end and a snap ring 148 fitting in a groove 149 in the cylinder member 142, at the opposite end. A piston member 150, shown in its retracted position, having a head portion 152 and a shank portion 154 extending through the closure block 146 and is suitably connected to the electrode connecting block 156 and insulated therefrom in a conventionally known manner. The electrode tip 116 is secured in the electrode connecting block 156 and, as in the previously described welding gun, is hollow. An inlet water passage 158 and connection 160 and an outlet water passage 162 and connection 164 are provided in the electrode connecting block 156 to allow the flow of a coolant fluid therethrough. A tubular conduit 166 extends through a chamber 168 in the electrode block 156 and into the hollow electrode tip 116 to provide passage of fluid from the inlet 158 to the hollow tip. The tubular conduit 166 is suitably retained in the electrode block as by the pin 170 extending through the walls of the block and through the conduit. The electrode coolant fluid flows continuously through the electrode tip to maintain as low a temperature as possible in the electrode tip. A suitable electrode connection 172, such as the cable, is made to the electrode connecting block 156 to provide the necessary welding potential.

The cylinder member 142 is secured to an upper block 174 and the block is secured to a press device 176 by a bolt means 178. A passage 180 in the upper block 174 opens to the cylinder chamber 182 to provide access to the face 184 of the piston head portion 152. A seal 186, such as an O ring, below the top face 184 of the head prevents the flow of fluid around the head portion and into the cylinder below the head portion. Lower seals 188 such as O rings, prevent the passage of water or fluid along the shank portion if any should leak past the upper seal.

Fluid pressure in the conduit 180 acts on the face 184 of the piston member to force the piston member to its non-welding position, in which the head portion 152 abuts against the closure member 146. Again, the pressure necessary to advance the piston to its non-welding position is that of the plant water pressure system or the like.

Figure 7 shows a modification of a welding system using the welding gun of Figure 5. A plurality of welding guns 310 and 312 are mounted on a press device and connected to the manifold 318 by the conduits 306 and 308 in the upper block 174 of the welding guns. Inlet and outlet conduits 320 and 322 respectively are provided to the manifold 318 to allow the passage of a fluid, such as the plant water, and a one way check valve 324 is located at the inlet conduit 320 to allow fluid to pass in only one direction. A solenoid operated check valve 326 is disposed at the outlet conduit 322 which may be closed to stop the flow of water through the manifold. A low pressure relief valve 328 may be located downstream of the solenoid operated check valve 326.

An air-over-fluid intensifier, or booster, system is operatively connected to the fluid pressure system, such as through the conduit 330 to the manifold 318. The booster unit 348 is of the type shown in Figure 3. A suitable air supply 332 is located adjacent the booster unit 348 and a solenoid actuated, three-way, normally closed air valve 338 is disposed in the conduit 334 between the air supply and the booster unit.

Coolant manifold 340 and 342, located adjacent the welding guns, provide for the circulation of coolant through the electrode tips 316, the coolant inlet manifold 342 having conduits 344 connected to the coolant inlet passage 158 in the electro connecting block 156, and the conduits 346 connected to the outlet passage 162 in the electrode connecting block and to the coolant outlet manifold 340. Circulation through the electrode tips is maintained at all times.

The operation of the system shown in Figure 7 is as follows: A workpiece is loaded on a movable platen 314 and raised to a welding position engaging the electrode tips 316 of the welding guns 310 and 312. The electrode tips 316 and electrode connecting blocks 156, being attached to the piston member 150 in the welding guns (Figure 5), moves the piston members 154 upwardly to force the fluid out of the cylinder chambers 182. When the movable platen reaches the welding position, the outlet solenoid operated check valve 326 is closed, thus closing the system to flow of fluid in any direction and the welding operation is begun. At the proper time, the solenoid operated air valve 338 connects the air supply 332 to the booster unit 348 to force the piston member 86 of the booster unit into the cylinder member 80 (Figure 3) and displace a quantity of fluid. The displaced fluid is introduced into the fluid pressure system and acts through the manifold 318 and welding gun inlet conduits 306 and 308, and on the faces 184 of the piston members. The piston members are thus advanced to bear against the parts to be welded and to follow the weld indentation during the period of weld collapse. On completion of the welding operation, the air valve 338 is opened to the atmosphere, to depressurize the booster unit 348, and the solenoid operated outlet check valve 326 is opened to allow the flow of fluid through the system. The platen 314 is lowered to the unloading and loading position and the pressure of the fluid flowing through the manifold and into the welding guns is sufficient to advance the welding guns to the non-welding position. A new workpiece is placed on the movable platen and the cycle is repeated.

A second modification of the welding system is shown in Figure 8, utilizing a closed fluid pressure system. A plurality of welding guns 410 and 412 are provided above a movable platen 414 which is adapted to receive and raise a workpiece, the welding guns being of the type shown in Figure 5. The fluid pressure system comprises a manifold 418, connected to the welding guns by the conduits 406 and 408, and has a water supply or reservoir 404 located adjacent the manifold. An inlet conduit 420 connects the reservoir 404 to the manifold 418, and a one way check valve 424 disposed therein to allow passage of fluid only from the reservoir to the manifold. The manifold outlet conduit 422 has a solenoid operated check valve 426 disposed therein to stop the flow of fluid through the system. A second check valve 427 is located in the manifold outlet conduit 422 adjacent the reservoir 404 to prevent the back-flow of fluid from the reservoir in the direction of the manifold. An air pressure regulator 402 is connected to the reservoir through the conduit 403 and serves to provide air pressure to the reservoir and induce the flow of fluid through the system. An air-over-fluid intensifier, or booster, system is connected to the fluid pressure system by the conduit 430 and to air supply 432, a normally closed, three-way, solenoid operated check valve 438 is connected to the air supply by the conduit 434 and a booster unit 448 is connected to the air valve 438. Coolant inlet and outlet manifolds 440 and 442, conduits 444 and 446, connected to the electrode connecting blocks 156 provide the free circulation of coolant fluid through the electrode tips 416.

The operation of the welding system of Figure 8 is as follows: A workpiece is loaded on the movable platen 414 and the platen is raised against the electrode tips 416 of the welding guns 410 and 412, the electrode tips, being attached to the piston members 150 of the welding guns, move the piston members upwardly in the cylinders 142 forcing the fluid in the cylinders out of the guns and through the manifold 418 and manifold outlet conduit 442 to the reservoir 404. When the workpiece is in welding position, and the excess fluid has entered the reservoir, the solenoid operated check valve 426, in the manifold outlet 422, is closed, to prevent further flow of fluid to the reservoir. The solenoid operated air valve 438, in the air-over-fluid booster system, opens to supply air to the face of the piston member 82 in the booster unit 448. The piston member 82 advances into the cylinder member 80 to force a small amount of fluid into the manifold 418 to act on the faces 184 of the piston members 150 (Figure 5) in the welding guns 410 and 412. This added pressure advances the piston members and the electrode tips to bear against and hold the workpiece and to follow the weld indentation during the period of weld collapse. The booster system air valve 438 is then opened to the atmosphere to relieve the pressure on the piston members 150 and the manifold outlet check valve 426 is opened. The movable platen 414 is returned to its loading and unloading position, and the pressure of the fluid in the fluid system acts on the piston members 150 in the welding guns to advance the electrode tips 416 to the non-welding position. The fluid coolant circulating in the electrode tips is flowing at all times to keep the electrode tips as cool as possible. A new workpiece is loaded on a movable platen and the cycle is repeated.

Figure 6:
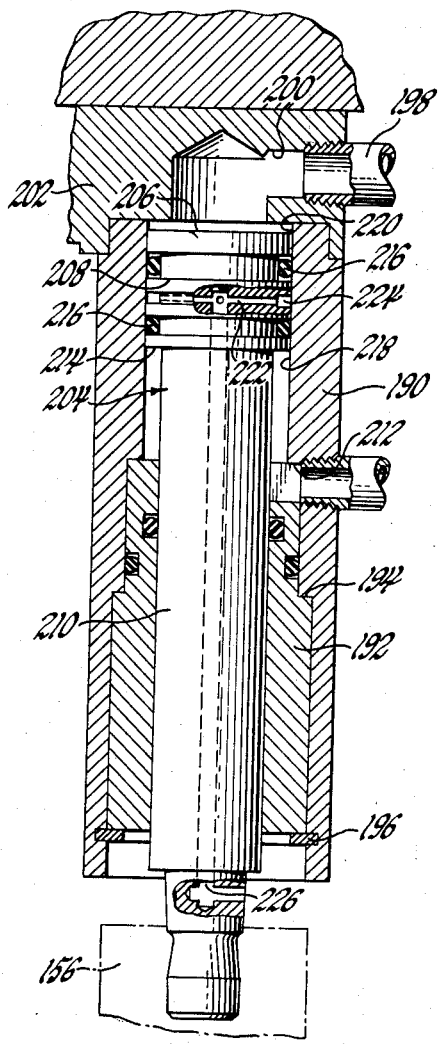
Figure 6 is a view of a modified welding gun, with parts broken away and in section, to show the operation thereof.

Figure 6 shows a third type of welding gun applicable to press welding systems of the type described. This welding gun is a modification of the type shown in Figure 5 and consists of a tubular cylinder member 190 having a closure block 192, secured therein by the shoulders 194 at one end and the snap ring 196 at the other, receivable in the side wall of the tubular member 190. The fluid pressure system inlet conduit 198 connects with a passage 200 in the upper closure block 202, the passage communicating with the upper face 206 of the piston member 204, shown in its retracted position. The piston member 204 consists of head portion 208 and a shank portion 210 extending through the lower closure block 192 and connected to the electrode supporting block 156. The piston shank portion is insulated from the electrode block in any conventionally known manner.

A second conduit connecting passage 212 formed through the side wall of the tubular cylinder 190 provides access to the lower face 214 of the piston member head portion 208 so that a pressure applied through the passage will hold the piston member in its retracted position. The pressure system feeding the passage may be of air or of fluid.

The head portion 208 of the piston member has a plurality of seals 216, such as O rings, disposed about the circumference thereof to prevent the leakage of fluid from the upper conduit and passageways to the chamber 218 below the lower face of the head portion, and to prevent the leakage of air or fluid from the chamber below the lower face to the fluid chamber 220 above the upper face. Bleed passages 222 are provided communicating with a groove 224, between the seal members, and with a main passage 226 extending axially through the center of the piston member and to the atmosphere at a point between the electrode connecting block 156 and the lower closure block 192. Thus, any possible leakage around the seal members 216 will be conveyed through the bleed passages to the atmosphere and there will be no intermixing of air from the lower chamber and fluid from the upper chamber, or of two different types of fluid as may be used in the two chambers.

In conjunction with the welding gun of Figure 6, a modification of the booster unit is used, the structure being shown in Figure 4. A tubular housing member 227 is closed at one end by a cylinder member 228 which receives the piston member 230. A conduit 232 extends through the outer tubular wall and through the cylinder member to communicate with the cylinder 234 and to convey fluid thereto. An outlet connection 236 provides for conveying the fluid to the inlet passage 212 of the welding gun and a seal 238, such as an O ring, prevents the back-flow of fluid around the piston member. The piston member head portion is as is shown in Figure 3 and identified by the numeral 84.

Figure 9 illustrates a modification of the press welding system utilizing the welding gun of Figure 6 and the modified booster unit of Figure 4. A movable platen 514 is provided beneath a plurality of welding guns 510 and 512 which are connected to the fluid pressurse system manifold 518 by the conduits 506 and 508. The fluid pressure system operates from the plant water system and an inlet conduit 520 to the manifold 518 conveys the plant water to the system. A check valve 524 disposed in the inlet conduit allows the flow of fluid only in the direction of the fluid manifold. An outlet conduit 522 from the manifold 518 carries the water back to the plant water system and has a solenoid operated check valve 526 disposed therein which may be actuated to stop the flow of fluid through the system.

An air-over-hydraulic booster system is operatively connected to the fluid pressure system and comprises an air supply 532 located adjacent the device. A conduit 534 connecting the air supply to the booster unit and a normally closed, three-way, solenoid operated air valve 538, disposed in the conduit 534, allow air to pass to the booster unit 548. A conduit 530 connects the booster unit to the fluid pressure system, such as to the manifold 518.

A piston retracting pressure system is provided adjacent the welding guns consisting of a manifold member 550 having conduits 552 connecting the manifold member to the welding guns 510 and 512. A booster unit 554, of the type shown in Figure 4, is operatively connected to one end of the manifold member 550 and the piston member 230 is actuated by the air supply 532, through the conduit 556 and the normally open, three-way, solenoid actuated air valve 558. A reservoir 560, located adjacent the booster unit 554, supplies the fluid to the booster system through the conduit 232 communicating with the cylinder 234 of the booster unit. A compensator 562 is provided at the opposite end of the manifold 550 from the booster unit, which consists of a chamber 564 having a spring actuated diaphragm 566 therein.

Electrode coolant manifolds 540 and 542 are provided, with inlet conduits 544 and outlet conduits 546 providing the circulation of fluid through the electrode connecting blocks 156 and the electrode tips 516.

The operation of the modification as illustrated in Figure 9 is as follows: With the movable platen 514 in the position shown in full lines, the electrode tips 516 in the position shown in dashed and dotted lines, the solenoid operated air valve 558 in the piston retraction system connecting the air supply 532 to the booster unit 554, and the retraction system pressurized, the piston members 210 of the welding guns will be held in the retracted position by the air under pressure acting through the conduits 552 and against the lower faces 214 of the piston members 210 (Figure 6). The solenoid actuated check valve 526 and the lower pressure relief valve are open, allowing free flow of fluid through the system. A workpiece is loaded on the movable platen and the platen moved to the welding position to begin the cycle of operation. The solenoid operated air valve 558 in the piston retraction system is then vented to the atmosphere, allowing the piston members 230 in the booster unit 554 to retract. The fluid pressure, through the inlet conduit 520 and the manifold 518, acts against the upper faces 206 of the welding gun piston members 210 (Figure 6) to force the piston members and the electrode tips 516 into engagement with the workpiece on the movable platen. The solenoid actuated check valve 526 is then closed to prevent further free flow of fluid through the fluid pressure system, followed by the energizing of the solenoid operated air valve 538 in the booster system to further pressurize the fluid pressure system. Air acts on the piston member 82 in the air-over-fluid booster unit 548, displacing an amount of fluid through the conduit 530, into the manifold 518 and against the upper faces 206 of the welding gun piston members 210 (Figure 6). Thus, the electrode tips 516 are forced against the workpiece for proper welding contact and follow the weld indentation during the period of weld collapse. At the completion of the welding operation, the air valve 538 in the booster system is vented to the atmosphere, relieving the pressure on the piston member 82 and the welding gun pistons 210, and the solenoid actuated check valve 526 is opened to restore free flow of fluid through the system. The air valve 558 in the piston retraction system is energized, again connecting the air supply 532 to the piston member 230 of the booster unit 554. An adequate amount of fluid is displaced into the manifold 550, through the conduits 552, and against the lower faces 214 of the welding gun piston members 210 (Figure 6). Since the pressure on the upper faces 206 has been relieved, the piston members 210 will be retracted by the displaced fluid, disengaging the electrode tips 516 from the workpiece, and the electrode tips will be retained in the retracted position. The movable platen 514 and the workpiece are lowered to the unloading and loading position, and the cycle is repeated.

Figure 10 illustrates a further modification of the press welding device, in which the system of Figure 9 is provided with the closed fluid pressure system. As illustrated in Figure 10, a plurality of welding guns 610 and 612 are disposed above the movable platen 614 and connected to the manifold 618 through the conduits 606 and 608. The manifold 618 is operatively connected to the reservoir 604 through the inlet conduit 620 and the outlet conduit 622 and the check valves 624 and 627 serve to prevent the back-flow of fluid through the conduits 620 and 622. A solenoid operated check valve 626 is disposed in the manifold outlet conduit 622 to prevent the flow of fluid through the system as desired. An air-over-fluid booster unit 648 of the type shown in Figure 3, is operatively connected to the fluid pressure system as by the conduit 630 to the manifold 618. A welding gun piston retraction system is provided, comprising a manifold 650 connected by the conduits 652 to the welding guns, and communicating with the lower faces 214 of the piston members 204 in the welding guns. A fluid reservoir 660 is located adjacent the booster unit 654 and connected thereto through the conduit 232.

The operation of the modification shown in Figure 10 is as follows: With the movable platen 614 in the position shown in full lines, the electrode tips 616 in the position shown in dashed and dotted lines, the solenoid operated air valve 658 in the piston retraction system connecting the air supply with the booster unit 654, and the retraction system pressurized, the piston members 210 of the welding guns will be retained in the retracted position by the air under pressure acting through the conduits 652 and against the lower faces of the piston members 210 (Figure 6). The solenoid actuated check valve 626 is open, allowing free flow of fluid through the fluid pressure system. A workpiece is loaded on the movable platen 614 to begin the cycle of operation and the platen is raised into the welding position. The solenoid operated air valve 658 in the piston retraction system is then vented to the atmosphere, allowing the piston member 230 to retract, and the fluid pressure through the inlet conduit 620, from the fluid reservoir 604, and through the manifold 518, acts against the upper faces 206 of the welding gun piston members 210 (Figure 6) to force the electrode tips 616 into engagement with the workpiece on the movable platen. The solenoid actuated check valve 626 is then closed, to prevent free flow of fluid through the fluid pressure system, followed by the energizing of the solenoid operated air valve 638, in the booster system, to pressurize the fluid in the fluid pressure system. Air acts on the piston member 82 in the air-over-fluid booster unit 648, displacing an amount of fluid through the conduit 630, into the manifold 518 and against the upper faces 206 of the welding gun piston members 210 (Figure 6). The check valve 624 in the conduit 620 prevents the flow of this displaced fluid back to the reservoir 604. The electrode tips 616 are thus forced against the workpiece for proper welding contact and follow weld indentation during the period of weld collapse. At the completion of the welding operation the air valve 638 in the booster system is vented to the atmosphere, relieving the pressure on the piston member 82 and consequently on the welding gun pistons 210. The solenoid actuated check valve 626 is opened to restore free flow of fluid through the system. The air valve 658 in the piston retraction system is energized, again connecting the air supply with the piston member 230 of the booster unit 654. An adequate amount of fluid is displaced from the reservoir 660, into the manifold 650, through the conduits 652, and against the lower faces 214 of the welding gun piston members 210 (Figure 6). Since the pressure on the upper faces 206 has been relieved, the piston members 210 will be retracted by the displaced fluid in the retraction system, disengaging the electrode tips 616 from the workpiece, and the electrode tips will be retained in the retracted position. The movable platen 614 and the workpiece are lowered to the unloading and loading position and the cycle is repeated.

A modification of the device shown in Figure 10 is illustrated in Figure 11, in which the retraction system is air operated rather than air-over-fluid operated. The parts are similar, with the exception of the air system which includes a manifold 662 having conduits 664 connecting with the lower chambers 218 of the welding gun cylinders 190. The manifold is operatively connected to the air supply 632 with a normally closed, three-way, solenoid actuated air valve 666 disposed in the connecting conduit 668.

The operation of the modification shown in Figure 11 is essentially the same as that described for the device shown in Figure 10.

Figure 12 illustrates a further modification of the press welding device, incorporating a closed fluid pressure system and a combined fluid pressure and piston retraction system. As shown in Figure 12, a plurality of welding guns 710 and 712, of the type shown in Figure 6, are disposed over a movable platen 714 and operatively connected to a fluid manifold 718 through the conduits 706 and 708. A water supply reservoir 704 is located adjacent the manifold 718 and is connected thereto through the manifold inlet conduit 720 and the manifold outlet conduit 722. A check valve 724 in the inlet conduit prevents the back-flow of fluid therethrough, and a solenoid actuated check valve 726 in the outlet conduit 722 provides for closing the fluid pressure system to the fluid flow. A check valve 727 is located in the outlet conduit 722 to prevent the flow of fluid from the reservoir 704 through the outlet conduit 722. An air-over-fluid booster system is operatively connected to the fluid pressure system as by the conduit 730 to the manifold 718. A solenoid actuated, three-way, normally closed air valve 738 is disposed in the air supply conduit 734 between the air supply 732 and the booster unit 748, the booster unit being of the type illustrated in Figure 3.

The retraction system is also connected to the water supply reservoir 704 through the inlet conduit 750, the manifold 752, and the outlet conduit 754. A check valve 756 in the inlet conduit prevents the back-flow of fluid therethrough and a solenoid actuated check valve 758 in the manifold outlet conduit 754 provides for stopping the flow of fluid through the system as desired. An air-over-fluid booster system is operatively connected to the retraction system by the conduit 760 connected with the manifold 752. Air is supplied to the booster unit 762, of the type shown in Figure 4, through a conduit 764 having a normally open, three-way, solenoid operated air valve 766 disposed therein.

The coolant inlet and outlet manifolds 740 and 742 and conduits 744 and 746 provide for cooling the electrode connecting blocks 156 and electrode tips 716 through the free circulation of fluid therethrough.

The operation of the modification shown in Figure 12 is as follows: With the movable platen 714 in the position shown in full lines, the electrode tips 716 in the positions shown in dashed and dotted lines, the solenoid actuated check valves 758 and 726 open, allowing free flow of fluid through the fluid pressure system and through the piston retraction system, the solenoid actuated air valve 738 in the booster system being open to the atmosphere, and the solenoid actuated air valve 766 in the piston retraction system connecting the air supply 732 with the booster unit 762 and acting on the piston member 82, retaining the welding gun piston members 210 in the retracted position as previously described, the cycle of the operation is started. A workpiece is loaded on a movable platen 714 and the platen is raised into welding position beneath the electrode tips 716. The solenoid actuated air valve 766 in the piston retraction system is then vented to the atmosphere and the solenoid actuated check valve 758 is opened, allowing free flow of fluid through the piston retraction system. The piston member 82 in the booster unit 762 retracts, and the fluid pressure through the inlet conduit 720 and the manifold 718 acts against the upper faces 206 of the welding gun piston members 210 (Figure 6) to force the piston members and the electrode tips 716 into engagement with the workpiece on the movable platen. The solenoid actuated check valve 726 is then closed to prevent further free flow of fluid through the fluid pressure system and the solenoid actuated air valve 738 is energized to connect the air supply 732 with the piston member 82 in the booster unit 748. The air acting on the last mentioned piston member displaces an amount of fluid through the conduit 730 into the manifold 718 and against the upper faces 206 of the welding gun piston members 210 (Figure 6). The check valves 724 and 756 prevent the back flow of fluid from the fluid pressure system and the piston retraction system respectively to the water supply reservoir 704. The electrode tips 716 are thus forced against the workpiece, by the pressure of the displaced fluid from the booster unit 748, for proper welding contact and to follow the weld indentation during the period of weld collapse. At the completion of the welding operation, the air valve 738 in the booster system is vented to the atmosphere, relieving the pressure on the piston member 82 of the booster unit 748 and the welding gun piston members 210 and the solenoid actuated check valve 726 is opened to restore free flow of fluid through the system. The check valve 758 in the piston retraction system is closed and the air valve 766 is opened to pressurize the piston member 82 of the booster unit 762, displacing an amount of fluid against the lower faces 214 of the welding gun piston members 210 (Figure 6) and retracting the welding gun piston members and the electrode tips. The movable platen is then lowered to the unloading and loading position and the cycle of operation is repeated.

In the systems of Figures 1, 7, and 9 which may utilize a plant water system for fluid pressure, it is necessary to corrosion-proof all parts that the plant water will contact. This may be accomplished in any conventionally known manner. In the systems illustrated in Figures 8, 10, 11 and 12, utilizing a closed fluid pressure system, a conventional additive may be introduced into the system to curb corrosion. In all systems, a water filter may be placed in the fluid pressure system inlet conduit, or in the reservoir outlet, to prevent passage of impurities through the system.

In the modification illustrated in Figures 9, 10, 11, and 12, having the double acting welding guns and the piston retraction system, it is possible to mount the welding guns at various angles with respect to the welding press and movable platen to accommodate the welding operation to be accomplished. It is also possible to perform a welding operation on a workpiece of variable contour, which may be loaded or unloaded on the movable platen without interfering with the projecting welding guns. The movable platen raises the workpiece to the welding position, followed by lowering of the electrode tips of the welding guns to engagement with the workpiece. Thus, it is obvious that the welding guns may be mounted at various angles and in various planes.

I claim:

1. A welding press including a plurality of welding guns disposed in relatively fixed position therein and a movable platen adapted to cause engagement of the electrode ends of said welding guns with a workpiece, a fluid pressure system operatively connected to said welding guns for maintaining the electrode tips of said welding guns in engagement with said workpiece, an air-over-fluid system connected to said fluid pressure system for further pressurizing said welding guns and advancing the electrode ends thereof during weld collapse, and electrode cooling means provided within each of said welding guns to cool the electrode ends thereof after the welding operation.

2. A welding press including a plurality of welding guns disposed in relatively fixed relation therein and a movable platen adapted to engage the electrode tips of said welding guns with a workpiece, piston means provided in each of said welding guns and operatively connected with the electrode tips of said welding guns, a fluid pressure system operatively connected to said welding guns and pressurizing said piston means for maintaining the electrode tips of said welding guns in engagement with said workpiece, and an air-over-water system communicating with said fluid pressure system to further pressurize said piston means and advance the electrode tips of said welding guns during the period of weld collapse.

3. A welding press including a plurality of welding guns disposed in relatively fixed relation therein and a movable platen adapted to engage the electrode ends of said welding guns with a workpiece, fluid pressure means operatively connected to said welding guns for maintaining the electrode ends of said welding guns in engagement with said workpiece, electrode cooling means provided within each of said welding guns to cool the electrode ends thereof after the welding operation, and means to provide further pressure on said welding guns and advance the electrode ends thereof during the period of weld collapse.

4. A welding press including a plurality of welding guns disposed in relative fixed relation therein and platen means adapted to engage the electrode ends of said welding guns with a workpiece, a combination fluid pressure and cooling system operatively connected to said welding guns for maintaining the electrode ends of said welding guns in engagement with said workpiece in welding position and for cooling said electrode ends of said welding guns after the welding operation, and an air-over-fluid booster unit communicating with said pressure and cooling system for further pressurizing and advancing the electrode ends of said welding guns during the period of weld collapse.

5. A fluid pressure system for use with a welding press which includes a plurality of welding guns mounted in relative fixed relation to a movable platen disposed therebelow, a movable platen adapted to raise workpieces into welding position relative to said welding guns, said system including a manifold member having fluid flowing therethrough, fluid passageways formed through each of said welding guns and connected in series with said manifold, means provided within each of said welding guns and responsive to fluid pressure in said fluid pressure system for maintaining the electrode ends of said welding guns in engagement with a workpiece on said platen, inlet and outlet check valves operatively disposed at opposite ends of said manifold and maintaining a static head of fluid pressure in said manifold and passageways, and an air-over-fluid booster unit operatively connected to said manifold for further pressurizing the fluid in said manifold and passageways to advance said fluid responsive means and the electrode ends of said welding guns at the time of weld collapse.

6. A combination pressure and coolant fluid system for use with a welding press having a plurality of welding guns disposed in relative fixed relation to a movable platen for raising workpieces into welding position relative to said welding guns, said fluid system including a water manifold, water passageways formed through each of said welding guns and connected in series with said water manifold, means responsive to water flow through said passageways for holding the electrode ends of said welding guns in advanced position, said passageways being formed within said welding guns for communication with said flow responsive means and with said electrode ends of said welding guns, said flow responsive means being retractable upon engagement of a workpiece with the electrode ends of said welding guns for displacing fluid flow in said passageways successively through each next adjacent welding gun at successively higher velocity and greater fluid flow, inlet and outlet check valves operatively connected to the inlet and outlet ends respectively of said water manifold for closing said manifold and maintaining static head of pressure within said welding guns, and an air-over-water booster unit operatively connected to said manifold for further pressurizing the fluid flowing in said manifold and passageways to advance said fluid responsive means and the electrode ends of said welding guns at the time of weld collapse.

7. A welding press including a plurality of welding guns disposed in relative fixed relation over a movable platen, a movable platen adapted to receive and raise a workpiece into engagement with the electrode ends of said welding guns, a combination fluid pressure and cooling system including a fluid manifold, fluid passages formed through each of said welding guns and connected in series with said fluid manifold, said fluid flowing freely through said manifold and said passages before and after the welding operation performed by said welding guns, inlet and outlet check valves operatively disposed at opposite ends of said fluid manifold for closing said manifold during the welding operation performed by said welding guns and maintaining a static head of pressure in said manifold and said passages, piston means provided in each of said welding guns and responsive to the fluid flow therethrough for holding the electrode ends of said welding guns in advanced position, said piston means being retractable on engagement of a workpiece with the electrode ends of said welding guns for displacing fluid flow through said passages successively through each next adjacent welding gun for cooling said welding guns, and an air-over-fluid booster unit operatively connected to said fluid manifold for further pressurizing the fluid flowing in said manifold and the piston means in said welding guns for advancing the electrode ends of said welding guns during the time of weld collapse.

8. A welding press including a plurality of welding guns disposed in relative fixed relation over a movable platen, a movable platen adapted to receive and raise a workpiece into engagement with the electrode ends of said welding guns, a combination water pressure and cooling system including a water manifold, water passages formed through each of said welding guns and connected in series with said water manifold, inlet and outlet check valves operatively disposed at opposite ends of said water manifold for closing said manifold during the welding operation performed by said welding guns and to open said manifold to the flow of water through said manifold when the welding operation is not being performed, piston means provided in each of said welding guns and responsive to the flow of water therethrough for holding the electrode ends of said welding guns in advanced position, said piston means being retractable on engagement of said workpiece for displacing water through said passages successively through each next adjacent welding gun for cooling said welding guns, a low pressure relief valve connected to said water manifold to prevent the flow of water therethrough when said piston means is in the advanced position and to allow the flow of water therethrough when said piston means is in the retracted position and before said inlet and outlet check valves close said manifold, and an air-over-water booster unit operatively connected to said water manifold to pressurize the water flowing in said manifold and acting on said piston means for advancing the electrode ends of said welding guns during the time of weld collapse.

9. A fluid circulating system for use with a welding press which includes a plurality of welding guns mounted in relative fixed relation to a movable platen disposed therebelow, a movable platen adapted to raise workpieces into welding position relative to said welding guns, said system including a water manifold, water passageways formed through each of said welding guns and connected in series with said manifold, means provided within each of said welding guns responsive to the pressure of water flowing through said passageways for advancing the electrode ends of said welding guns to a full extended position when said platen is in a non-engaged position, and said fluid pressure responsive means being retractable upon the engagement of the electrode ends of said welding guns with a workpiece on said platen for displacing a quantity of water from each of said welding guns successively through each next adjacent welding gun for cooling said series connected welding guns.

10. The fluid circulating system of claim 9 having a coolant fluid collecting chamber formed within said water passageways of each of said welding guns and a variable capacity dependent upon the disposition of said fluid pressure responsive means therewithin.

11. A welding press including a plurality of welding guns disposed in relative fixed relation over a movable platen, a movable platen adapted to receive and raise a workpiece into engagement with the electrode ends of said welding guns, a fluid pressure system operatively connected to said welding guns for maintaining the electrode ends of said welding guns in engagement with a workpiece on said platen, an air-over-fluid booster unit connected to said fluid pressure system for further pressurizing the electrode ends of said welding guns to advance the electrode ends of said welding guns during the time of weld collapse, and an electrode cooling system operatively connected to the electrode ends of said welding guns to allow circulation of fluid therethrough and cool the electrode ends of said welding guns after a welding operation.

12. A fluid pressure system for use with a welding press which includes a plurality of welding guns mounted in relative fixed relation therein and a movable platen adapted to engage the electrode ends of said welding guns in welding position with a workpiece, a coolant system operatively connected to the electrode ends of said welding guns and having coolant flowing therethrough, said fluid pressure system including a manifold, a fluid passage in each of said welding guns and in communication with said manifold, piston means provided within each of said welding guns and responsive to the pressure of the fluid flowing therethrough for maintaining the electrode ends of said welding guns in engagement with said workpiece in said welding position, and means for further pressurizing said piston means to advance the electrode ends of said welding guns during the time of weld collapse.

13. In a welding press, a plurality of welding guns disposed in relative fixed relation in said press, electrode tips secured to said welding guns, platen means adapted to engage a workpiece and said electrode tips, electrode cooling means operatively connected to said welding guns for cooling said electrode tips after a welding operation performed by said welding guns, means responsive to fluid pressure disposed within each of said welding guns to maintain said electrode tips in engagement with said workpiece and to maintain said electrode tips in a retracted position after disengagement of said electrode tips and said workpiece following the welding operation, a fluid pressure system operatively connected to said welding guns and actuating said pressure responsive means, first air-over-fluid booster means communicating with said fluid pressure system for further pressurizing said pressure responsive means to advance said electrode tips during the period of weld collapse, and second air-over-fluid booster means communicating with said pressure responsive means to maintain said pressure responsive means and said electrode tips in retracted position as said electrode tips and said workpiece are separated to allow for removal and replacement of a workpiece.

14. In a welding press, a plurality of welding guns disposed in relative fixed relation over a movable platen; an electrode tip secured to each of said welding guns; a movable platen adapted to receive and raise a workpiece into engagement with said electrode tips; a free-flowing electrode coolant system including inlet and outlet manifolds, passages formed in said electrode tips and connected with said manifolds to allow free flow of coolant through said electrode tips; a water pressure system operatively connected to said welding guns and including a manifold, a passage formed in each of said welding guns and connected to said manifold, inlet and outlet check valves operatively disposed in said water pressure system to close said manifold to the flow of water therethrough, piston means disposed in each of said welding guns and connected to said electrode tips and responsive to the pressure of water flowing through said manifold and said passages, said piston means operating to maintain said electrode tips in engagement with a workpiece on said platen; a first air-over-water booster unit communicating with said water pressure system to further pressurize said piston means and said electrode tips and advance said electrode tips during the period of weld collapse; and a second air-over-water booster unit communicating with said piston means to retain said piston means and said electrode tips in a retracted position during the loading and unloading of a workpiece on said movable platen.

15. The welding press of claim 14 having a low pressure relief valve disposed in the outlet side of said water pressure manifold to close said manifold when said welding guns are in a non-welding position, said relief valve being opened by the pressure induced in said system when said electrode tips are retracted by said movable platen.

16. In a welding press a plurality of welding guns disposed in relative fixed relation over a movable platen, electrode tips formed on the ends of said welding guns, a movable platen adapted to receive and raise a workpiece into engagement with said electrode tips; an open fluid pressure system operatively connected to said welding guns and including a manifold, conduits providing communication between said manifold and each of said welding guns, inlet and outlet check valves disposed at opposite ends of said manifold to allow passage of fluid therethrough when said electrode ends are in a non-welding position and to prevent the free flow of fluid through said manifold when said electrode tips are in a welding position, piston means disposed in each of said welding guns and connected to said electrode tips, said piston means being responsive to the pressure in said manifold and said conduits to maintain said electrode tips in engagement with a workpiece on said movable platen; an air-over-fluid booster unit operatively connected to said fluid pressure system to further pressurize said piston means and advance said electrode tips during the period of weld collapse; and an electrode cooling system including inlet and outlet manifolds, conduits connecting each of said manifolds with said electrode tips, and freely flowing coolant fluid passing through said manifolds and said conduits and said electrode tips for cooling said electrode tips after the welding operation.

17. The welding press of claim 16 having a low pressure relief valve disposed in the outlet end of said manifold to close said manifold when said electrode tips are in a non-welding position, said valve being set to open at a pressure slightly above the pressure in said system when said electrode tips are in a non-welding position such that when said system pressure is increased by the retraction of said electrode tips and said piston means said relief valve will allow free flow of fluid through said system.

18. A closed fluid pressure system for use with a welding press which includes a plurality of welding guns disposed in relative fixed relation over a movable platen, electrode ends secured to each of said welding guns, a movable platen adapted to receive and raise a workpiece into engagement with said electrode ends; said system including a manifold, a passage formed in each of said welding guns and connected to said manifold, a fluid reservoir adjacent said manifold and having inlet and outlet conduits connected thereto, an air regulator in communication with said reservoir to induce the flow of fluid through said conduits and said manifold, a check valve in said reservoir inlet conduit to close said system to the flow of fluid when said electrode ends are in welding position, piston means disposed in each of said welding guns and responsive to the pressure in said manifold for maintaining said electrode ends in engagement with a workpiece on said movable platen, and an air-over-fluid booster unit connected to said fluid pressure system for further pressurizing said system and said electrode ends to advance said electrode ends during the period of weld collapse.

19. In a welding press a plurality of welding guns disposed in relative fixed relation over a movable platen, electrode tips secured to each of said welding guns, a movable platen adapted to receive and raise a workpiece into engagement with said electrode tips, an electrode cooling system operatively connected to said electrode tips and including inlet and outlet manifolds, conduit means connecting said inlet and outlet manifolds with said electrode tips, first fluid pressure means operatively connected to said welding guns and including a manifold, a passage formed in each of said welding guns and connected to said manifold, inlet and outlet valves disposed at opposite ends of said manifold for closing said manifold and preventing the flow of fluid therethrough when said electrode tips are in welding position, a first air-over-fluid booster unit connected to said first fluid pressure system for pressurizing said welding guns and advancing the electrode ends thereof during the period of weld collapse, and a second fluid pressure system operatively connected to said welding guns and including a manifold, conduit means connecting said manifold to each of said welding guns, a fluid reservoir communicating with said manifold to supply fluid to said second system, and a second air-over-fluid booster unit connected to said second fluid pressure system for pressurizing said welding guns and retaining said welding guns in retracted position for loading and unloading said movable platen when said platen is lowered.

20. A welding press having a plurality of welding guns disposed in relative fixed relation over a movable platen, electrode tips formed on each of said welding guns, a movable platen adapted to receive and raise a workpiece into engagement with said electrode tips, a first fluid pressure system including a manifold, conduit means connecting said manifold to each of said welding guns, a fluid reservoir disposed adjacent said manifold and having inlet and outlet conduits connected thereto, and an air regulating valve connected to said reservoir for inducing the flow of fluid through said conduits and said manifold, a check valve disposed in said reservoir inlet conduit for closing said system to the flow of fluid therethrough, pressure responsive means in each of said welding guns and responsive to the flow of fluid through said manifold for maintaining said electrode tips in engagement with a workpiece on said movable platen, an air-over-fluid booster unit operatively connected to said fluid pressure system for further pressurizing said pressure responsive means and advancing said electrode ends during the period of weld collapse, a second fluid pressure system operatively connected to said welding guns and communicating with said pressure responsive means and including a manifold, conduit means connecting said manifold to said welding guns, a reservoir supplying fluid to said manifold, and a second air-over-fluid booster unit connected to said second fluid pressure system for applying pressure to said pressure responsive means and maintaining said means in retracted position to permit loading and unloading of said movable platen when said platen is lowered.

21. A welding press having a plurality of welding guns disposed in relative fixed relation over a movable platen disposed therebelow, electrode ends on each of said welding guns, a movable platen adapted to receive and raise a workpiece into engagement with said electrode ends, a first fluid pressure system operatively connected to said welding guns and including a manifold, conduit means between said manifold and said welding guns, a reservoir disposed adjacent said manifold and having inlet and outlet conduits connecting said reservoir and said manifold, check valves disposed in said inlet and outlet conduits to allow passage of fluid in only one direction in each of said conduits, an air regulator operatively connected to said reservoir for inducing the flow of fluid through said outlet conduit and said manifold and said inlet conduit, piston means disposed in each of said welding guns and responsive to the fluid pressure in said manifold for maintaining said electrode ends in engagement with a workpiece on said movable platen, an air-over-fluid booster unit operatively connected to said fluid pressure system for further pressurizing said piston means and advancing said electrode ends during the period of weld collapse, and an air pressure system operatively connected to said welding guns and said piston means to maintain said piston means and said electrode ends in retracted position to permit loading and unloading of said movable platen as said movable platen is lowered to its workpiece receiving position.

22. A welding press including a plurality of welding guns disposed in relative fixed relation to a movable platen, electrode ends on each of said welding guns, a movable platen adapted to receive and raise a workpiece into engagement with said electrode ends, a fluid pressure system operatively connected to said welding guns and including a first manifold, passages formed in each of said welding guns and connected to said first manifold, a reservoir disposed adjacent said manifold and having inlet and outlet conduits connecting said reservoir with said manifold, an air regulator connected to said reservoir and inducing the flow of fluid through said inlet conduit and said manifold and said outlet conduit, piston means disposed in each of said welding guns and responsive to the pressure of the fluid flowing through said manifold for maintaining said electrode ends in engagement with a workpiece on said movable platen, a second manifold operatively connected to said reservoir and communicating with said piston means and said welding guns, and a first air-over-fluid booster unit connected with said fluid pressure system for further pressurizing said piston means and advancing said electrode ends during the period of weld collapse, and a second air-over-fluid booster unit connected to said second manifold for actuating said piston means and retaining said electrode ends in retracted position during the loading and unloading of said movable platen.

23. A method of operating a welding press including welding guns and a movable platen adapted to engage the electrode ends of said welding guns with a workpiece, and a fluid pressure system operatively connected to said welding guns, said method comprising the steps of loading a workpiece in said press in alignment with said welding guns, engaging the electrode ends of said welding guns with said workpiece against the pressure of fluid in said fluid pressure system, closing a check valve in said fluid pressure system to stop the free flow of fluid therethrough, opening an air valve to actuate a booster unit and further pressurize the electrode ends of said welding guns and advance the electrode ends of said welding guns during the period of weld collapse, energizing the electrode ends of said welding guns to perform a welding operation on said workpiece, venting said air valve in said air-over-fluid pressure system to relieve the added pressure on said welding guns, opening the check valve in said fluid pressure manifold to allow free flow of fluid therethrough and to cool the electrode tips of said welding guns, and disengaging said electrode ends of said welding guns and the welded workpiece for unloading thereof and the loading of a new workpiece.

24. A method of operating a welding press including a plurality of welding guns, a movable platen adapted to engage the electrode ends of said welding guns, a fluid pressure system operatively connected to said welding guns, a first air-over-fluid pressure system connected to said welding guns, and a second air-over-fluid pressure system connected to said fluid pressure system, said method comprising the steps of opening an air valve in said first air-over-fluid pressure system to actuate a first booster unit and apply pressure to the welding guns for maintaining the electrode ends of said welding guns in a retracted position, loading a workpiece on said movable platen, raising said workpiece and said movable platen into welding position, closing a check valve in said fluid pressure system to stop the free flow of fluid therethrough, opening an air valve in said second air-over-fluid pressure system to actuate a second booster unit and further pressurize the electrode ends of said welding guns and advance the electrode ends of said welding guns during the period of weld collapse, energizing the electrode ends of said welding guns to perform a welding operation on said workpiece, venting the air valve in said second air-over-fluid pressure system to relieve the pressure on said welding guns, operating said air valve in said first air-over-fluid pressure system to actuate said first booster unit and apply pressure to the welding guns for retracting the electrode ends thereof, lowering said movable platen to remove the workpiece on which the welding operation has been completed, and opening said fluid pressure system check valve to restore the free flow of fluid through said fluid pressure system.

25. A method of operating a welding press including a plurality of welding guns, a movable platen adapted to engage the electrode ends of said welding guns, a fluid pressure system operatively connected to said welding guns, a first air-over-fluid pressure system connected to said welding guns, and a second air-over-fluid pressure system connected to said fluid pressure system, said method comprising the steps of opening an air regulator in a fluid reservoir in said fluid pressure system to induce the flow of fluid therein, closing an air valve in said first air-over-fluid pressure system to actuate a first booster unit and retract the electrode ends of said welding guns, loading a workpiece on said movable platen, raising said movable platen and said workpiece into welding position, closing a check valve in said fluid pressure system to stop the flow of fluid therethrough, opening said air valve in said second air-over-fluid pressure system to relieve the retraction pressure on the electrode ends of said welding guns and allow said electrode ends to engage the workpiece on said platen, opening an air valve in said second air-over-fluid pressure system to actuate a second booster unit and further pressurize and advance the electrode ends of said welding guns during the period of weld collapse, energizing the electrode ends of said welding guns to perform a welding operation on said workpiece, venting the air valve in said second air-over-fluid pressure system to relieve the added pressure on said welding guns, opening an air valve in said first air-over-fluid pressure system to actuate said first booster unit and apply pressure to the welding guns for maintaining the electrode ends of said welding guns in a retracted position, lowering said movable platen to remove the workpiece on which the welding operation has been completed, and opening said check valve in said fluid pressure system to restore the free flow of fluid therein.

26. A method of operating a welding press including a plurality of welding guns, a movable platen adapted to engage the electrode ends of said welding guns, a fluid pressure system operatively connected to said welding guns, an air-over-fluid pressure system connected to said fluid pressure system and an air sytem connected to said welding guns, said method comprising the steps of opening an air valve in said air system to apply pressure to the welding guns and maintain the electrode ends thereof in a retracted position, loading a workpiece on said movable platen, raising said workpiece and said movable platen into welding position, closing an air valve in said air system to relieve the retraction pressure on said welding guns and allow the electrode ends thereof to engage said workpiece, closing a check valve in said fluid pressure system to stop the free flow of fluid therethrough, opening an air valve in said air-over-fluid pressure system to actuate a booster unit and further pressurize the electrode ends of said welding guns and advance the electrode ends of said welding guns during the period of weld collapse, energizing the electrode ends of said welding guns to perform a welding operation on said workpiece, venting the air valve in said air-over-fluid pressure system to relieve the pressure on said welding guns, opening said air valve in said air system to apply pressure to the welding guns and maintain the electrode ends thereof in a retracted position, lowering said movable platen to remove the workpiece on which the welding operation has been completed, and opening said fluid pressure system outlet valve to restore the free flow of fluid through said system.

27. A method of operating a welding press including a plurality of welding guns, a movable platen adapted to engage the electrode ends of said guns, a fluid pressure system operatively connected to said welding guns, a first air-over-fluid pressure system operatively connected to said welding guns for retracting the electrode ends thereof, and a second air-over-fluid pressure system operatively connected to said fluid pressure system for pressurizing said welding guns, said method comprising the steps of closing a check valve in said first air-over-fluid pressure system to prevent the flow of fluid therethrough, opening an air valve in said first air-over-fluid pressure system to maintain the electrode ends of said welding guns in a retracted position, opening an air regulator valve in a reservoir to induce the flow of fluid through said fluid pressure system, loading a workpiece on said movable platen, raising said workpiece and said movable platen into welding position, closing a first check valve in said fluid pressure system to stop the free flow of fluid therethrough, closing an air valve in said first air-over-fluid pressure system to relieve the retraction pressure on said welding guns and allow the electrode ends thereof to engage said workpiece, opening an air valve in said second air-over-fluid pressure system to actuate a booster unit and further pressurize the electrode ends of said welding guns and advance the electrode ends thereof during the period of weld collapse, venting the air valve in said second air-over-fluid pressure system to relieve the pressure on said welding guns, opening an air valve in said first air-over-fluid pressure system to maintain the electrode ends of said welding guns in a retracted position, opening said first check valve in said fluid pressure system to restore the free flow of fluid through said fluid pressure system, and lowering said movable platen to remove the workpiece on which the welding operation has been completed.

28. A fluid pressure system for use with a welding press which includes a plurality of welding guns mounted in relative fixed relation over a movable platen disposed therebelow, a movable platen adapted to receive and raise workpieces into welding position relative to said welding guns, a coolant system operatively connected to the electrode ends of said welding guns and having coolant flowing therethrough, said fluid pressure system including a manifold, a fluid passage in each of said welding guns and in communication with said manifold, piston means provided within each of said welding guns and responsive to the pressure of the fluid flowing therethrough for maintaining the electrode ends of said welding guns in engagement with a workpiece on said platen, and means for further pressurizing said piston means to advance the electrode ends of said welding guns during the time of weld collapse, and inlet and outlet check valves operatively disposed at opposite ends of said manifold for closing said manifold during the welding operation performed by said welding guns, said inlet and outlet check valves being adapted to open said manifold to a continuous flow of fluid therethrough after the welding operation performed by said welding guns.

29. A fluid pressure system for use with a welding press which includes a plurality of welding guns mounted in relative fixed relation over a movable platen disposed therebelow, a movable platen adapted to receive and raise workpieces into welding position relative to said welding guns, a coolant system operatively connected to the electrode ends of said welding guns and having coolant flowing therethrough, said fluid pressure system including a manifold, a fluid passage in each of said welding guns and in communication with said manifold, piston means provided within each of said welding guns and responsive to the pressure of the fluid flowing therethrough for maintaining the electrode ends of said welding guns in engagement with a workpiece on said platen, and means for further pressurizing said piston means to advance the electrode ends of said welding guns during the time of weld collapse, and inlet and outlet check valves disposed at opposite ends of said manifold for closing said manifold during the welding operation performed by said welding guns, and a low pressure relief valve operatively connected to the downstream end of said system to prevent the continuous flow of fluid through said manifold when said welding guns are in a non-welding position, said relief valve being adapted to open in response to the pressure induced in said system when said movable platen and workpiece engage the electrode ends of said welding guns to allow the flow of fluid through said manifold and said welding guns.

References Cited in the file of this patent
UNITED STATES PATENTS

| | | |
|---|---|---|
| 2,033,851 | Roth | Mar. 10, 1936 |
| 2,063,258 | Martin | Dec. 8, 1936 |
| 2,159,860 | Platz | May 23, 1939 |
| 2,256,246 | Geibel | Sept. 16, 1941 |
| 2,496,104 | Paner | Jan. 31, 1950 |
| 2,714,150 | Kaiser | July 26, 1955 |
| 2,833,911 | Fetz | May 6, 1958 |